United States Patent [19]

Buzgo

[11] 4,408,320
[45] Oct. 4, 1983

[54] SPACER FOR USE IN TESTING INFORMATION RECORDED DISCS

[75] Inventor: Alexander W. Buzgo, Trenton, N.J.
[73] Assignee: RCA Corporation, New York, N.Y.
[21] Appl. No.: 295,515
[22] Filed: Aug. 24, 1981
[51] Int. Cl.³ .............................................. G11B 23/00
[52] U.S. Cl. ................................ 369/290; 369/291; 369/292; 428/66
[58] Field of Search ...................... 369/290, 291, 292; 428/65, 66; 411/55, 56, 57, 58, 59, 61, 62, 63, 64

[56] References Cited

U.S. PATENT DOCUMENTS

| 1,999,082 | 4/1935 | Buechting | 411/157 |
|---|---|---|---|
| 2,559,786 | 7/1951 | Mueller | 369/290 |
| 2,906,536 | 9/1959 | Mauerhoff | 274/1 |
| 3,051,496 | 8/1962 | Borgia | 274/42 |
| 3,169,023 | 2/1965 | Rivas | 274/42 |
| 3,370,632 | 2/1968 | Kubokawa | 411/159 |
| 3,854,729 | 12/1974 | Downs | 274/1 |
| 4,276,636 | 6/1981 | Morgan et al. | 369/291 |

FOREIGN PATENT DOCUMENTS

| 469666 | 12/1928 | Fed. Rep. of Germany | 369/291 |
|---|---|---|---|
| 1081343 | 6/1954 | France | 411/156 |
| 15963 | of 1895 | United Kingdom | 411/159 |
| 397687 | 1/1974 | U.S.S.R. | 411/157 |

Primary Examiner—Steven L. Stephan
Attorney, Agent, or Firm—Birgit E. Morris; Donald S. Cohen

[57] ABSTRACT

A spacer ring for use in stress testing molded information recorded discs. The spacer rings minimize the splattering or dripping of large droplets of water on the discs after the discs have been subjected to high temperature and humidity so as to increase the accuracy of the results of the test.

12 Claims, 3 Drawing Figures

SPACER FOR USE IN TESTING INFORMATION RECORDED DISCS

BACKGROUND OF THE INVENTION

The present invention relates to a spacer for use in testing information recorded discs, and particularly to a spacer for use in testing for effects of temperature and humidity on such discs.

A capacitive video disc system has been described by Clemens in U.S. Pat. No. 3,842,194. The disc described comprises a plastic disc containing an information track having audio, video and color information in the form of a surface relief pattern arranged in the surface of the disc which can be played back with a stylus. The video disc of Clemens had a conductive metal coating to provide the conductivity required for capacitive pickup and a thin layer of a dielectric material thereover. An electrode on the playback stylus completed the capacitor.

Improvements have been made in this system whereby the disc is made from a conductive plastic material, as disclosed by Fox et al in copending application Ser. No. 105,550 filed Dec. 20, 1979, which is a continuation of application Ser. No. 818,279 filed July 25, 1977, now abandoned. A polyvinylchloride based molding composition is mixed with sufficient amounts of finely divided carbon black particles so that the resulting composition has the conductivity required for capacitive playback. A thin layer of the polyvinylchloride surrounds each of the conductive carbon particles so that a thin dielectric layer is present at the surface. The use of a conductive plastic eliminates the need for separate metal and dielectric layers on the disc surface and thus has simplified manufacture of the disc.

If the disc described in the Fox et al application is not manufactured properly, heat and moisture can adversely affect the playing characteristics of the discs. In order to determine whether the discs are manufactured properly, sample discs are subjected to a "stress" test in which the discs are subjected to heat and high humidity and then tested for playing characteristics. For this test a plurality of the discs are stacked on a spindle with plastic spacer rings between adjacent discs to space the discs apart. The spindle of discs are placed in a chamber which is heated and filled with moisture to create a high humidity in the chamber. After subjecting the discs to heat and humidity for a predetermined period of time, the spindle of discs are removed from the chamber, the discs are removed from the spindle and then tested for playing characteristics. It has been found that although the discs themselves are dry when removed from the spindle, the plastic spacer rings tend to retain some water which either drips or splatters onto the discs as they are removed from the spindle. This provides large water spots on the discs which give false adverse playing characteristic readings.

SUMMARY OF THE INVENTION

An annular spacer ring having concave top and bottom surfaces and at each of the top and bottom surfaces at least one notch extending radially inwardly from the outer peripheral surface and at least one notch extending radially inwardly from the inner peripheral surface. The spacer ring when used between adjacent discs in the stress testing of the discs minimizes the possibility of water dropping or splattering on the discs to adversely affect the testing of the discs.

DETAILED DESCRIPTION

Figure 1:
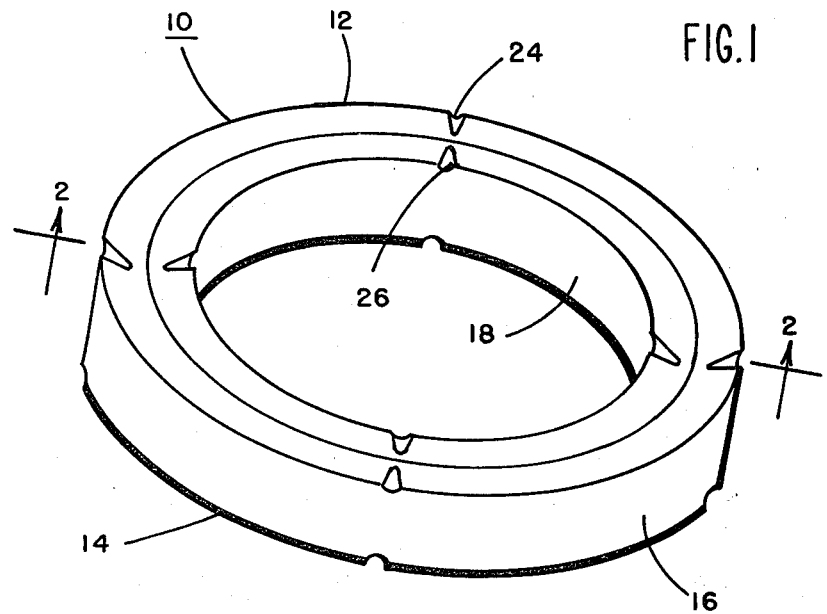
FIG. 1 is a perspective view of an annular spacer ring incorporating the present invention.
Figure 2:
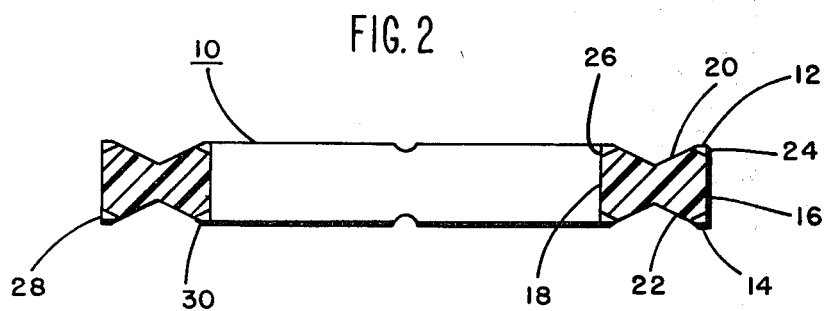
FIG. 2 is a sectional view taken along line 2—2 of FIG. 1.
Figure 3:
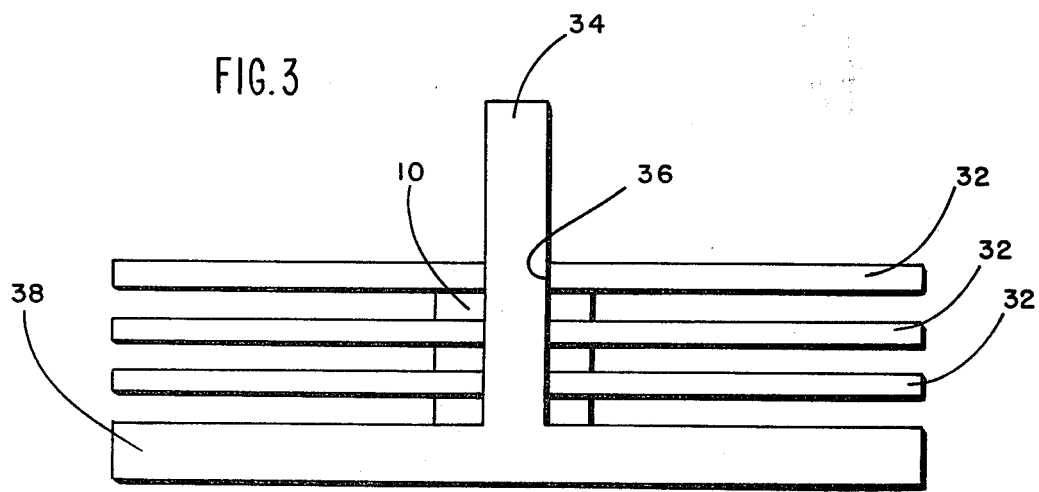
FIG. 3 is a partial sectional view showing the use of the spacer ring between discs on a spindle.

Referring to FIGS. 1 and 2, the spacer ring of the present invention is generally designated as 10. The spacer ring 10 is an annulus of a material to which water will not readily adhere, for example, a plastic such as polymethylmethacrylate resin. The spacer ring 10 has top and bottom surfaces 12 and 14 respectively, a cylindrical outer peripheral surface 16 and a cylindrical inner peripheral surface 18. The top and bottom surfaces 12 and 14 have grooves 20 and 22 respectively therein so that the top and bottom surfaces 12 and 14 are concave. A plurality of notches 24 extend radially across the top surface 12 from the outer peripheral surface 16 to the groove 20. A similar number of notches 26 extend radially across the top surface 12 from the inner peripheral surface 18 to the groove 20. Each of the notches 26 is in alignment with a separate one of the notches 24. Similarly, a plurality of notches 28 and 30 extend radially across the bottom surface 14 from the outer peripheral surface 16 and inner peripheral surface 18 respectively with each of the notches 30 being in alignment with a separate notch 28. The notches 24, 26, 28 and 30 provide passages from the grooves 20 and 22 respectively to the outer and inner peripheries 16 and 18 of the spacer ring 10. As shown, there are four sets of the notches in each of the top and bottom surfaces 12 and 14 with the sets of notches being uniformly spaced around the spacer ring 10. However, additional notches can be provided if desired.

The spacer rings 10 are used in testing information recorded discs, such as video discs, by mounting a plurality of the discs 32 on a spindle 34 which extends through the center holes 36 of the discs 32. The spindle 34 is mounted on a circular base plate 38. One or more of the spacer rings 10 is mounted around the spindle 34 between the base plate 38 and the first disc 32 and between each pair of adjacent discs 32. The spacer rings 10 have an outer diameter no greater than the unrecorded center portion of the information discs 32. The spindle 34 having discs 32 thereon is placed in a chamber which is heated and filled with steam so as to subject the discs 32 to heat and humidity. After the discs are subjected to the heat and humidity for a predetermined time the spindle is removed from the chamber. The discs 32 are removed from the spindle and subjected to a carrier distress test to determine the playing characteristics of the discs.

Carrier distress is the total amount of time in seconds (but discounting intervals of less than 10 microseconds) during disc playback when the r.f. output of the player arm is less than 150 millivolts peak-to-peak and the time when the r.f. output gives above 8.6 megahertz or below 3.1 megahertz in frequency, indicating a defect. Such defects are noted by the viewer as dropouts. The present acceptable level of carrier distress for a video disc is 3 seconds in one hour of playback time. Howver, water drops or stains on the surface of the disc will cause very high carrier distress, generally greater than about 10 seconds.

To determine the acceptability of the spacers 10 of the present invention, groups of video discs were stress tested with the old style spacer which has flat top and bottom surfaces and with the spacer ring of the present invention. The results of 54 video discs tested using the old spacer rings were compared with the results of 120 discs tested using the spacer rings of the present invention. Of the 54 tested with the old spacer rings, four of the discs (7.4%) had a carrier distress greater than 10 seconds. Of the 120 discs tested with the spacer ring of the present invention only 1 disc (0.8%) had a carrier distress of greater than 10 seconds. Thus, the spacer ring of the present invention reduced the number of discs which failed the test because of water which may have splattered or dripped onto the disc so as to provide more accurate results from the stress testing.

The above results were for the sides of the discs which faced upwardly. For the sides of the discs which faced downwardly the improvement provided by the spacer rings of the present invention was not as great. Of the 54 discs tested with the old style spacer ring only 1 (1.9%) had a carrier distress of greater than 10 seconds. Of the 120 discs tested with the spacer ring of the present invention only 1 (0.8%) had a carrier distress of greater than 10 seconds. However, this would be expected since the downwardly facing surfaces of the discs are not as subject to the possibility of water dripping or splattering thereon as are the upwardly facing surfaces of the discs.

Thus, there is provided by the present invention a spacer ring for use between the discs in stress testing the discs which greatly reduces the chances of water splattering or dripping onto the discs when they are removed from the spindle. This greatly increases the accuracy of the results of the test.

I claim:

1. A spacer ring for use in testing information recorded discs comprising an unbroken annular substantially flat body having concave top and bottom surfaces and at each of the surfaces at least one passage extending radially inwardly from the outer periphery of the body and at least one passage extending radially outwardly from the inner periphery of the body.

2. A spacer ring in accordance with claim 1 in which each of the top and bottom surfaces has a groove therein and extending therealong so as to provide the concave surfaces, and the passages open into the grooves.

3. A spacer ring in accordance with claim 2 in which the passages are provided by notches in the surfaces of the body.

4. A spacer ring in accordance with claim 3 including a plurality of the notches in each of the surfaces extending to the groove from each of the outer and inner peripheries of the body.

5. A spacer ring in accordance with claim 4 in which at each surface each notch extending from the outer periphery is in radial alignment with a notch extending from the inner periphery.

6. A spacer ring in accordance with claims 1 or 5 in which the spacer ring is of a plastic material.

7. In an apparatus for testing recorded discs which includes a plurality of said recorded discs stacked on a spindle with a spacer ring on said spindle between each pair of adjacent discs, the improvement comprising
each of said spacer rings being an unbroken annular substantially flat body having concave top and bottom surfaces and at each of the surfaces at least one passage extending radially inwardly from the outer periphery of the body and at least one passage extending radially outwardly from the inner periphery of the body.

8. An apparatus in accordance with claim 7 in which the outer diameter of each of the spacer rings is smaller than the outer diameters of the discs.

9. An apparatus in accordance with claim 8 in which each of the top and bottom surfaces of each spacer ring has a groove therein and extending therealong so as to provide the concave surfaces, and the passages open into the grooves.

10. An apparatus in accordance with claim 9 in which the passages in each of the spacer rings are provided by notches in the surface of the body.

11. An apparatus in accordance with claim 10 in which each of said spacer rings include a plurality of notches in each of the surfaces extending to the grooves from each of the outer and inner peripheries of the body.

12. An apparatus in accordance with claim 8 in which each of said spacer rings is of a plastic material.

* * * * *